Nov. 12, 1968     F. MAYER     3,411,074
METHOD OF MONITORING THE RELATIVE POSITIONS OF A FIXED
OBJECT AND A ROTARY MEMBER
Original Filed June 26, 1963
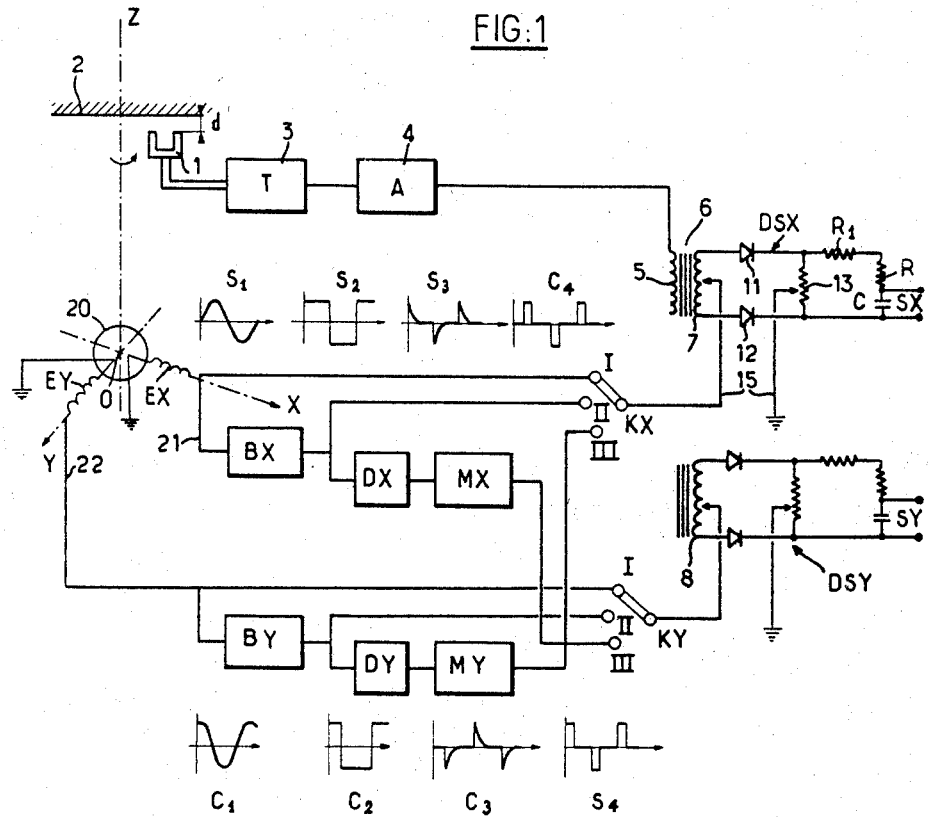
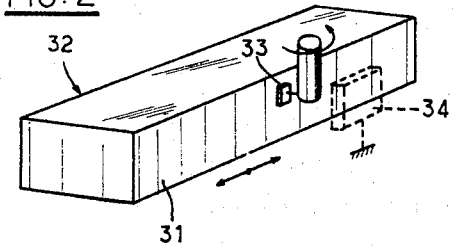
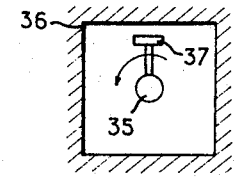
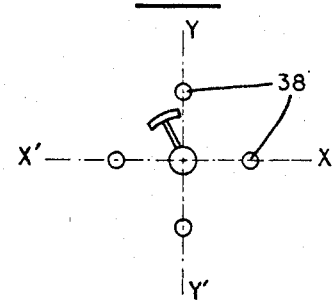
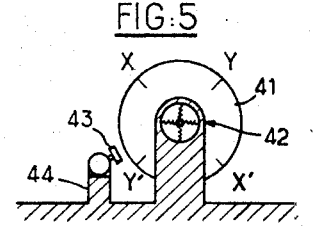
INVENTOR
FERDY MAYER
By Irwin S. Thompson
ATTY.

United States Patent Office 3,411,074
Patented Nov. 12, 1968

3,411,074
METHOD OF MONITORING THE RELATIVE POSITIONS OF A FIXED OBJECT AND A ROTARY MEMBER
Ferdy Mayer, 22 Rue Ampere, Grenoble, France
Continuation of application Ser. No. 290,744, June 26, 1963. This application Nov. 6, 1967, Ser. No. 681,033
Claims priority, application France, July 3, 1962, 902,779
6 Claims. (Cl. 324—34)

ABSTRACT OF THE DISCLOSURE

A method for monitoring the position of the surface of a non-rotating object relative to a rotary probe by rotating the probe adjacent to the surface, generating a signal whose instantaneous value is proportional to the instantaneous distance between the probe and the surface, electrically multiplying this signal by each of a pair of reference signals having a selected waveform and phase-shifted with respect to one another to produce two weighted outputs which together provide an indication of a condition of the surface.

---

This is a continuation of application Ser. No. 290,744 filed June 26, 1963, now abandoned.

The present invention relates to a method of monitoring the relative positions of a fixed object and a rotary member, using a probe which is placed on one of these members to face the other and which, in combination with an appropriate transducer, is adapted to supply a signal, preferably an electrical signal, conveying the variations in the distance of the probe relatively to the surface of the opposing member.

It is known to use a periodic measuring signal determined by the variation in the distance of a probe placed on the rotary member relatively to an object; at the same time to produce at least one periodic reference signal synchronised with the times when the probe passed a chosen location, and to divide the measuring signal into components synchronous with each reference signal.

The present invention essentially consists in shaping the reference signal or signals according to a correlating function to give the required results.

Experience has shown in fact that the possible uses of the methods and means for centering a member rotating in a fixed path can be extended to a great variety of applications simply by making an appropriate choice of the wave-shape for the reference signals.

The features and advantages of the invention will become apparent from the following description, referring to the accompanying drawings, in which:

FIG. 1 is a circuit diagram of a device designed for applying the invention, and FIGS. 2 to 5 are diagrams showing some applications of the invention by way of example.

According to the embodiment shown in FIG. 1, a probe 1, for example, a magnetic probe, is disposed at the end of a shaft (not shown) rotating about an axis OZ, opposite a surface 2. The shaft in question may be that of the spindle of a machine tool, and the surface 2 of the face of an object which is to be placed on the axis of the spindle. A transducer 3 associated with the probe is adapted by known means to generate an electrical signal varying as a function of the distance $d$ from the probe to the surface 2. The signal is applied, by means of an amplifier 4 and an appropriate transmission system (not shown), to the primary winding 5 of a transformer 6 having two identical secondary windings 7, 8. Each of the two secondary windings, of the type which are symmetrical at the middle point, feeds a synchronous detector DSX, DSY respectively. In the usual manner, each detector comprises a pair of diodes 11, 12 opposed to the terminals of a potentiometer 13, to which a pair of output terminals SX, SY are connected through a capacitor-resistor filter R-C and a series resistor $R_1$ of a sufficiently high value to prevent the peak from being detected. The load connected across the terminals SX, SY, for example an indicating apparatus or relay, will thus be passed through by a mean current proportional to the mean value of the signal detected.

The reference voltage is applied to each of the synchronous detectors by a pair of wires 15 connected to a selector KX or KY having a plurality of positions, for example three in the present case, an essential aspect of the invention being the adaptation of the wave shape of the reference singals to each type of application.

The source of reference signals may, for example, be an alternator 20 having a two phase permanent magnet. The alternator comprises two induction circuits EX, EY forming two output signals 21, 22 out of phase by 90°. In other words, these outputs supply two substantially sinusoidal waves which are dephased by 90° or in phase with the passage of the probe past two orthogonal axes OX, OY in a plane perpendicular to the axis of rotation OZ. Put differently again, the two output signals respectively are a sinusoidal singal $S_1$ and a cosinusoidal signal $C_1$, relatively to an initial moment defined by the passage of the probe past the axis OX for example.

The corresponding singals are fed directly to the contacts I of the selectors KX, KY respectively (after impedance adaptation, not shown).

The same waves are also applied to the inputs of respective Schmitt trigger circuits BX, BY adapted to supply square phased waves $S_2$, $C_2$ to the contacts II of the respective selectors KX, KY.

Finally, after differentiation at DX, DY the square waves supply triggering impulses $S_3$, $O_3$, which control respective monostable multivibrators MX, MY adapted to supply waves $S_4$, $C_4$ formed by alternate impulses which are of pre-determined and preferably controllable duration and are respectively synchronised with the times when the probe passes the axes OX and OY. As shown in the diagram, the outputs of the multivibrators MX, MY are connected to the contacts III of the selectors KY and KX respectively.

It will be seen that, by placing the selectors KX, KY in one or the other of the positions I, II, III, either sinusoidal, square or pulsed reference signals can be supplied to the synchronous detectors DSX, DSY.

When the apparatus is operating and when the shaft carrying the probe 1 has been set in rotation by its normal drive motor (not shown), the unit made up of the probe 1 and the transducer 3 becomes the source of a periodic measuring signal determined by the variations in the distance $d$, which results from the spacing between the surface 2 and a plane perpendicular to the axis of rotation OZ in which the probe moves. The spacing variations may themselves result from an inclination of the surface to the plane or from any irregularity in the surface. If rotation were very slow, it would of course be possible to observe the variations in the instantaneous value of the measuring signal, as a function of the angular position of the probe of a corresponding radial mechanical guide mark, by connecting an indicating instrument to the output of the amplifier A. But what is required here is dynamic measurement, that is to say at the normal rotary speed of the shaft or other member carrying the probe, when the variations in the instantaneous value of the measuring signal naturally escapes direct observation.

The function of the double synchronous detection effected at DSX and DSY is to separate two components respectively synchronous with the two reference signals chosen by the selectors KX, KY in the rapidly varying measuring signal applied to the primary winding of the transformer 6.

The measuring signals picked up at the output SX, SY represent the mean value of a complex wave resulting, in accordance with the known operation of synchronous detectors, from multiplying the periodic function of the measuring signal by the synchronous periodic function formed by the corresponding reference signal. The chosen reference signal consequently acts as a function correlating the periodic measuring signal.

By placing, for example, the selectors KX, KY in the position III and thus choosing impulse reference signals $C_4$, $S_4$, the control signal picked up at SX will correspond to the value of the measuring signal at the times when the probe passes the axis OX, and the control signal picked up at SY will correspond to the times when the probe passes the axis OY. The duration of the impulses will determine the parts of the rotary cycle of the probe when the signals from the probe will be recorded, and the intervals between impulses those parts of the cycle when the signals from the probe will be ignored. In other words, everything which happens when the probe is not aligned with the axes OX and OY is ignored and a zero "wave" is assigned to the corresponding parts of the measuring signal: this is a system of "pinpoint equilibrium."

By placing the selector in the position II so as to use the reference signal with square waves $S_2$, $C_2$, the control signal picked up, for example at SX, will correspond (to within a constant factor) to the mean of the measuring signal multiplied by the function $+1$ between 0 and 180°, $-1$ between 180 and 360°. This means indicates the positive or negative disequilibrium along the axis OY. It is thus a system of "constant equilibrium," attaching the same importance to all directions.

In position I, finally, there is a sinusoidal correlating function conferring maximum weight to the variations detected in the directions of the axes and a weight which decreases sinusoidally (to zero for plus or minus 45°) on both sides of these directions.

Each of these types of correlation functions is of interest, according to the applications considered; the three types described above are of course only examples, for there is nothing to prevent different forms of reference signals being worked out, adapted to various applications. Each of the three types of functions considered above is an odd function so that cancellation of the control signal picked up at X leads to symmetry relatively to the axis OY and vice versa. However this is not essential, and the use of an even correlation function could be envisaged; in appropriate cases this could be reduced to a single quasi-pinpoint impulse per cycle corresponding to passage of the probe through a single predetermined radial direction. More particularly, the use of a generator of reference signals may be envisaged, for example having three outputs, each adapted to emit a balanced impulse triggered by the passage of the probe opposite one of the three respective directions, which may be at 120° to one another or distributed in any manner over the path of the probe.

Conversely reference signals may be provided causing zero correlation over limited fractions of the angular parts, these fractions corresponding to irregularities which are inherent in the object probed and the action of which on the measuring signal is to be ignored; this may, for example be the case when the probe has to pass above a hollow (notch, etc.) or a projection (rib) on the object probed in the course of its rotation.

It does not appear necessary to elaborate on the very varied known means by which, in the present state of the art, the various wave-shapes which may be needed can be generated. Particular reference can be made to the possibility of developing reference signals of any shape photoelectrically, for example by disposing a source of light on the rotary member (shaft), so that a radial beam from the source illuminates an annular battery of photoelectric cells across a mask in which appropriately shaped apertures have been cut out; or again to the converse arrangement, with a photoelectric cell on the rotary member, facing a fixed annular luminous lamp screened by a mask.

It is of course possible to have recourse to all the known variants of phase detection systems: assemblies with two diode arrangements, assemblies with one or two triodes or transistors, assemblies with symmetry obtained not by a transformer but by symmetrical stages or the like.

Some examples of applications will be outlined with reference to the remaining figures, simply in order to illustrate the diversity of the possible uses of the invention.

One such example (FIG. 2) is the high precision dynamic alignment of a face 31 of an object 32 relatively to the movement of a table which is displaced longitudinally. For this purpose a lateral probe 33 is rotated opposite the face in question: when the object is displaced the lack of alignment is shown in the variation in the distance between the face and the probe when the latter passes opposite the face. In order to detect a corresponding indication of measurement, one solution is to have recourse to a pinpoint even balance function, that is to say, to one impulse per second emitted when the probe passes opposite the face 31. Another solution is to make use of the odd pinpoint correlation function formed by the signals $S_4$ or $C_4$ in FIG. 1: in this case, a metal plate 34 fixed to the frame is placed on the opposite side of the object relatively to the axis of the probe. In both cases, if the distance from the face 31 to the axis of the probe is not perfectly constant, a correlated signal is obtained.

Instead of using the metal plate 34 to produce geometric symmetry, it is obviously possible to inject an electrical equilibrium voltage to provide a "threshold" at the output of the phase detector, so as to produce electrical symmetry.

The same principle may be applied in making an "outline level" for copying. The rotary probe, which is of small dimensions, then turns its axis parallel to the surface of the outline to be followed: after detection, the electrical output actuates two motors which are displaced along two perpendicular axes. This form of control results in the rotary probe following the outline at a constant distance, without contact.

FIG. 3 shows an example of centering a shaft 35 in a square hole 36 with the aid of a lateral probe 37. This is an example of the application of the constant correlation function made possible by reference signals of the type $S_2$, $C_2$ in FIG. 1.

As shown in FIG. 4, a shaft may also be centered in a square defined by four rods: if the rods are disposed along the axes XX' YY', it will readily be seen that centering is obtained immediately with the pinpoint correlation performed by reference signals of the types $S_4$, $C_4$, in FIG. 1. In addition to the observation of mean values so far envisaged, which indicates the variations relatively to the position of symmetry along the axes X and Y, it is also possible to envisage and determine the angular position of the axis of rotation, that is to say, of the latter's angular spacing relatively to the theoretical axis (OZ, FIG. 1); the amount by which the measuring signal is out of phase with one or another of the reference signals in fact provides information about the angular position.

One can thus envisage applying the invention to high precision positioning on conveying machines.

A very interesting application of the sinusoidal balancing functioning is the centering of an object to be machined: more detailed analysis in fact shows that, if the object is centered by sinusoidal correlation the minimum of metal has to be removed to give a perfect circle.

The application of the invention to the problem of dynamic correlation should also be mentioned. A rotor 41 to be balanced (FIG. 5), mounted in "vibrating" bearings 42, rotates opposite the probe 43, which is here fixed on a support 44 integral with the frame. A reference generator, such as the generator 20 in FIG. 1, is connected to the shaft of the rotor in an angular position which is suitably marked for example by means of lines XX' YY' drawn on the rotor to correspond with the position of the poles of the rotor of the generator.

In rotation, due to the dynamic imbalance, the rotor is displaced as a function of the angular position (relatively to axis XY) and of the amount of imbalance. By using sinusoidal balancing, for example, the amplitude of the control indices obtained at the output SX, SY (FIG. 1) will directly give the amount of imbalance, and thus the weights necessary to correct it; their ratio, with the size and sign considered, will give the tangent of the angle and thus the system X–Y, which determines the angular position of the imbalance, and thus the place where the counterweight should be added.

The very high sensitivity of detection permits very accurate balancing even at low speeds. This method is very easy to put into practice (no long calculations to be made) and may be adapted to any rotating body, due to the mobility of the means used (receiver-emitter-probe).

What is claimed is:

1. A method for monitoring the position of the surface of a non-rotating object relative to a rotary probe, comprising the steps of:

rotating the probe adjacent the surface;

producing, at the probe output, a cyclic electrical measuring signal whose amplitude varies in proportion to variations in the distance between the probe and the surface during each cycle of probe rotation;

generating first and second alternating reference signals of identical waveform, one of which is 90° out of phase with the other and each of which has a period equal to the period of probe rotation, each of said reference signals having identical positive and negative voltage polarity portions with respect to a given reference level;

electrically multiplying said measuring signal by each of said reference signals separately for producing two outputs each representing a correlation, with respect to the given reference level, of said measuring signal with a respective reference signal; and filtering each said correlated output for obtaining a D.C. signal equal to the mean value of the correlated output with respect to the given reference level.

2. A method as defined in claim 1 wherein each of said reference signals is non-sinusoidal.

3. A method as defined in claim 2 wherein each of said reference signals is composed of rectangular wave portions.

4. A method as defined in claim 2 wherein each of said reference signals is constituted by a square wave train.

5. A method as defined in claim 2 wherein each of said reference signals is constituted by a pulse train, with each reference signal half period consisting of a single pulse whose duration is shorter than the reference signal half period.

6. A method as defined in claim 1 wherein said step of generating first and second alternating reference signals is carried out by generating a plurality of pairs of reference signals, each pair having a different waveform from the other pairs and each pair being composed of two identically-shaped balanced signals which are 90° out of phase with respect to one another, each reference signal having a period equal to the period of probe rotation, and said step of electrically muliplying is carried out by selectively multiplying said measuring signal separately by each reference signal of a selected pair.

References Cited

UNITED STATES PATENTS

| | | | |
|---|---|---|---|
| 2,300,999 | 11/1942 | Williams | 324—37 |
| 2,731,592 | 1/1956 | Federn | 73—66 |
| 2,970,256 | 1/1961 | Sazynski et al. | 324—37 |
| 3,038,342 | 6/1962 | Hack | 73—462 |
| 3,109,139 | 10/1963 | Branker | 324—37 |

ARCHIE R. BORCHELT, *Primary Examiner.*

R. J. CORCORAN, *Assistant Examiner.*